United States Patent [19]

Liang

[11] Patent Number: 5,212,376
[45] Date of Patent: May 18, 1993

[54] IMAGE SCANNER WITH AUTOMATIC SIGNAL COMPENSATION USING SAMPLED REFERENCE LIGHT

[75] Inventor: Raymond Liang, Taipei, Taiwan

[73] Assignee: Primax Electronics Ltd., Taipei, Taiwan

[21] Appl. No.: 891,235

[22] Filed: May 29, 1992

[51] Int. Cl.$^5$ .............................................. H01J 40/14
[52] U.S. Cl. .................................... 250/208.1; 358/484
[58] Field of Search ................ 250/208.1, 205, 214 A, 250/214 R; 358/213.13, 213.15, 475, 484

[56] References Cited

U.S. PATENT DOCUMENTS 4,989,100 1/1991 Ishima ................................... 358/475

Primary Examiner—David C. Nelms
Assistant Examiner—K. Shami
Attorney, Agent, or Firm—Merchant, Gould, Smith, Edell, Welter & Schmidt

[57] ABSTRACT

An image scanner includes a light source which illuminates a document being scanned, a reflex mirror set receiving a first light signal which results from light rays that are reflected by the document and a lens barrel which has an imaging lens arranged therein and which receives the first light signal from the reflex mirror set. A flexible optical transmission element has an input end provided in close proximity with the light source so as to receive a second light signal therefrom. A line image sensor is disposed adjacent to the lens barrel and receives the first light signal from the reflex mirror set and the second light signal from the optical transmission element. The line image sensor generates an image scan signal which corresponds to the first light signal and a brightness reference signal which corresponds to the second light signal. A signal compensation circuit receives the image scan signal and the brightness reference signal from the line image sensor. The signal compensation circuit processes and amplifies the image scan signal in accordance with the magnitude of the brightness reference signal, thereby compensating the image scan signal for instability in the brightness of light from the light source.

7 Claims, 7 Drawing Sheets

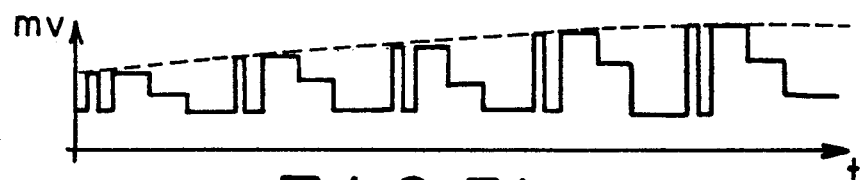
F I G. 7A
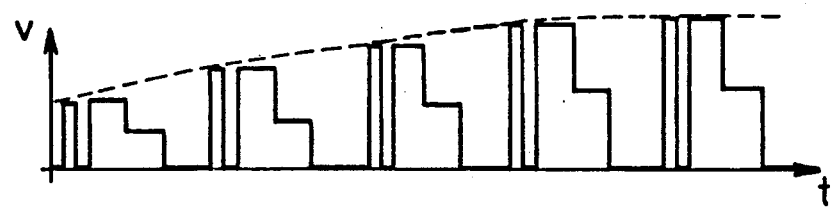
F I G. 7B
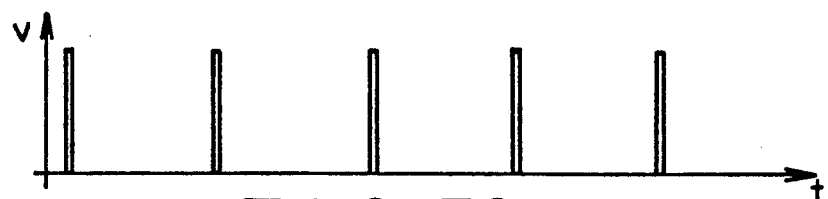
F I G. 7C
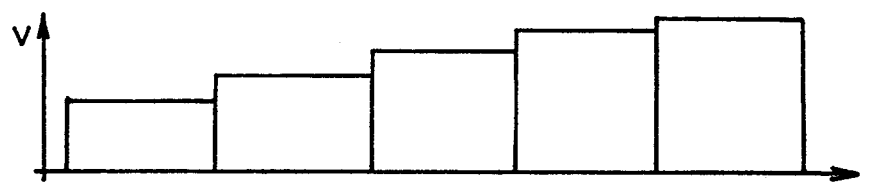
F I G. 7D
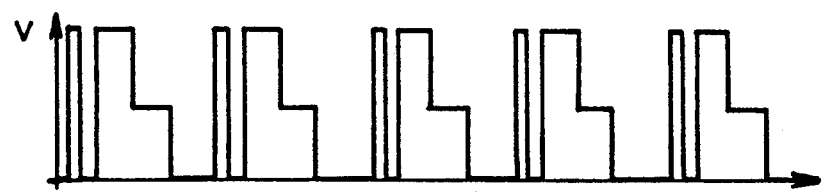
F I G. 7E

IMAGE SCANNER WITH AUTOMATIC SIGNAL COMPENSATION USING SAMPLED REFERENCE LIGHT

BACKGROUND OF THE INVENTION

1. Field of the Invention

The invention relates to an image scanner, more particularly to an image scanner with an automatic signal compensation device which is used to compensate for instability in the brightness of the light output of a light source of the image scanner.

2. Description of the Related Art

There are two types of light sources conventionally installed in image scanners. The first type is a light emitting diode (LED) array which is incapable of emitting white light and is thus seldom used in color image scanners. The second type is a fluorescent lamp, such as a cold cathode fluorescent tube (CCFT) or a daylight lamp, which is ideal for use in color image scanners.

Referring to FIG. 1, whenever a fluorescent lamp is activated, the brightness of its light output gradually intensifies before stabilizing. The fluorescent lamp undergoes a brief transition period, usually four to five minutes long, during which the fluorescent lamp is gradually heated before the brightness of its light output stabilizes.

Referring to FIG. 2, the brightness of the light output of the fluorescent lamp varies in accordance with the period of use. The intensity of the brightness of the light output decreases after prolonged use of the fluorescent lamp.

Because of the instability in the light output of the fluorescent lamp, there is therefore a need to compensate for such instability so as to ensure proper operation of the image scanner.

SUMMARY OF THE INVENTION

Therefore, the objective of the present invention is to provide an image scanner with an automatic signal compensation device to compensate for instability in the brightness of the light output of a light source of an image scanner.

Accordingly, the preferred embodiment of an image scanner of the present invention comprises:

a light source for illuminating a document being scanned;

a reflex mirror set receiving a first light signal which results from light rays that are reflected by the document;

a lens barrel having an imaging lens arranged therein and receiving the first light signal from the reflex mirror set;

a flexible optical transmission element, such as an optical fiber, having an input end provided in close proximity with the light source so as to receive a second light signal therefrom;

a line image sensor disposed adjacent to the lens barrel and receiving the first light signal from the reflex mirror set and the second light signal from the optical transmission element, said line image sensor generating an image scan signal corresponding to the first light signal and a brightness reference signal corresponding to the second light signal; and a signal compensation circuit receiving the image scan signal and the brightness reference signal from the line image sensor, said signal compensation circuit processing and amplifying the image scan signal in accordance with the magnitude of the brightness reference signal, thereby compensating the image scan signal for instability in the brightness of lightfrom said light source.

BRIEF DESCRIPTION OF THE DRAWINGS

Other features and advantages of the present invention will become apparent in the following detailed description of the preferred embodiment, with reference to the accompanying drawings, of which:

FIGS. 7A to 7E illustrate the signal waveforms at different nodes of the circuit diagram shown in FIG. 6;

DETAILED DESCRIPTION OF THE PREFERRED EMBODIMENT

Figure 1:
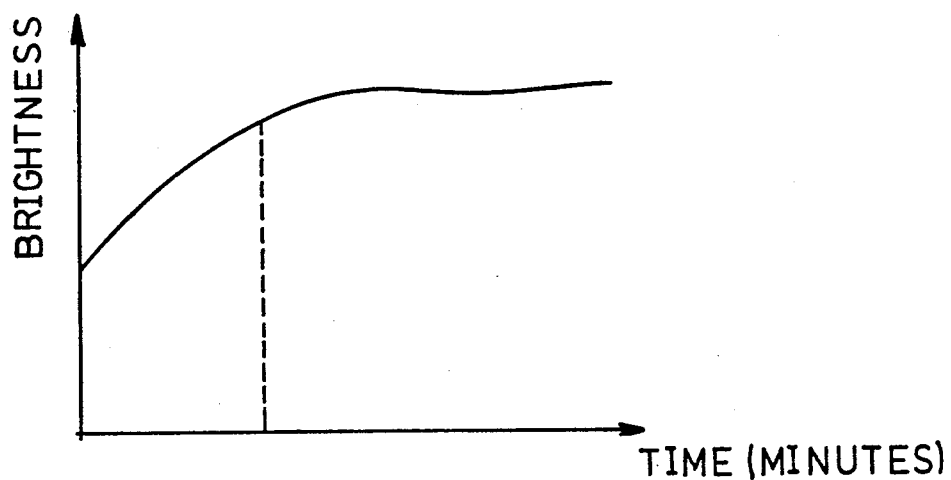
FIG. 1 is a plot of the brightness of the light output of a fluorescent lamp as a function of time during a brief transition period when the fluorescent lamp is activated.
Figure 2:
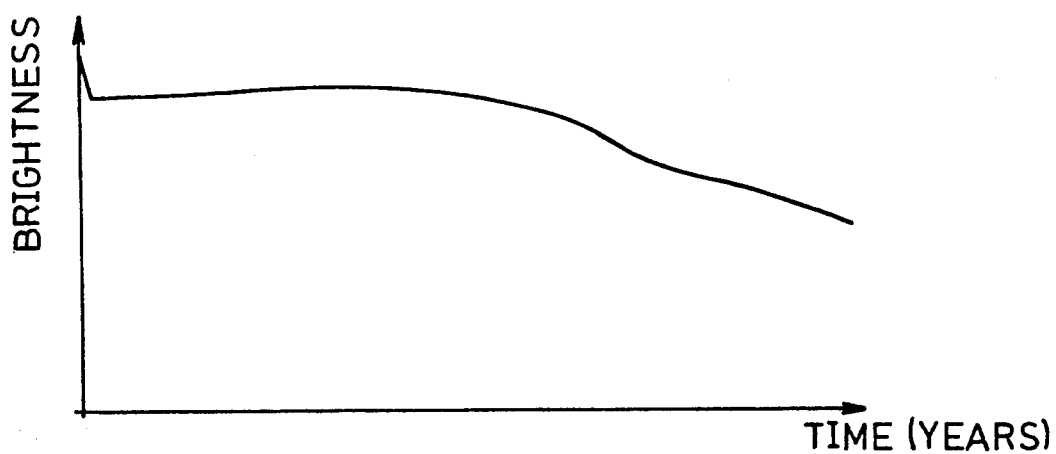
FIG. 2 is a plot of the brightness of the light, output of the fluorescent lamp as a function of the period of use.
Figure 3:
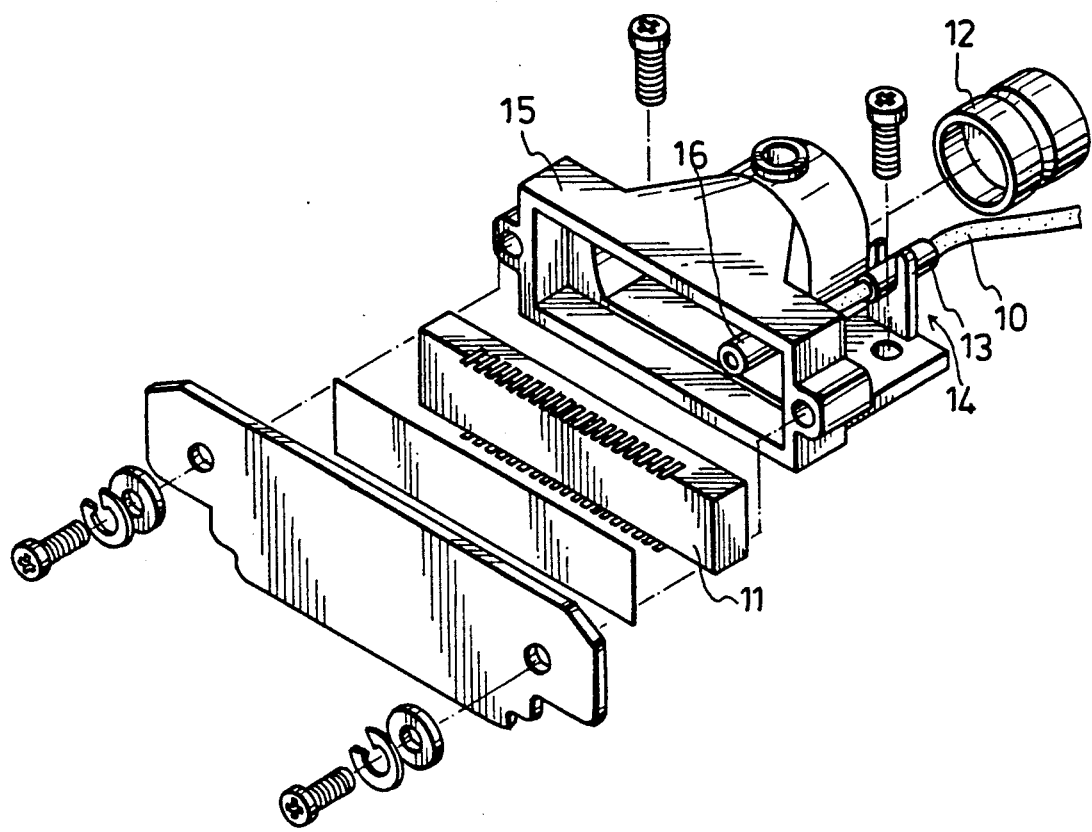
FIG. 3 is a fragmentary exploded view of the preferred embodiment of an image scanner according to the present invention.

Referring to FIG. 3, the automatic signal compensation device of the image scanner of the present invention comprises a flexible optical transmission element, such as an optical fiber (10). An input end of the optical fiber (10) is provided in close proximity with the light source of the image scanner. The optical fiber (10) receives light rays from the light source and sends the same to a line image sensor (i.e., a charge coupled device) (11). The line image sensor (11) generates a corresponding electrical signal which serves as a brightness reference signal. Light rays, which are reflected from the document being scanned, pass through an imaging lens (12) arranged inside a lens barrel (15) and are similarly received by the line image sensor (11). A rubber tubular sleeve (13) is provided on a predetermined portion of the optical fiber (10). The lens barrel (15) is provided with a seat (14) which engages the sleeve (13) so as to support the optical fiber (10). The optical fiber (10) has an output end which extends into the lens barrel (15) via a tubular guide (16). The tubular guide (16) ensures that the optical fiber (10) is disposed at a proper position relative to the line image sensor (11) and prevents light rays from the optical fiber (10) from interfering with those from the imaging lens (12).

Figure 4A:
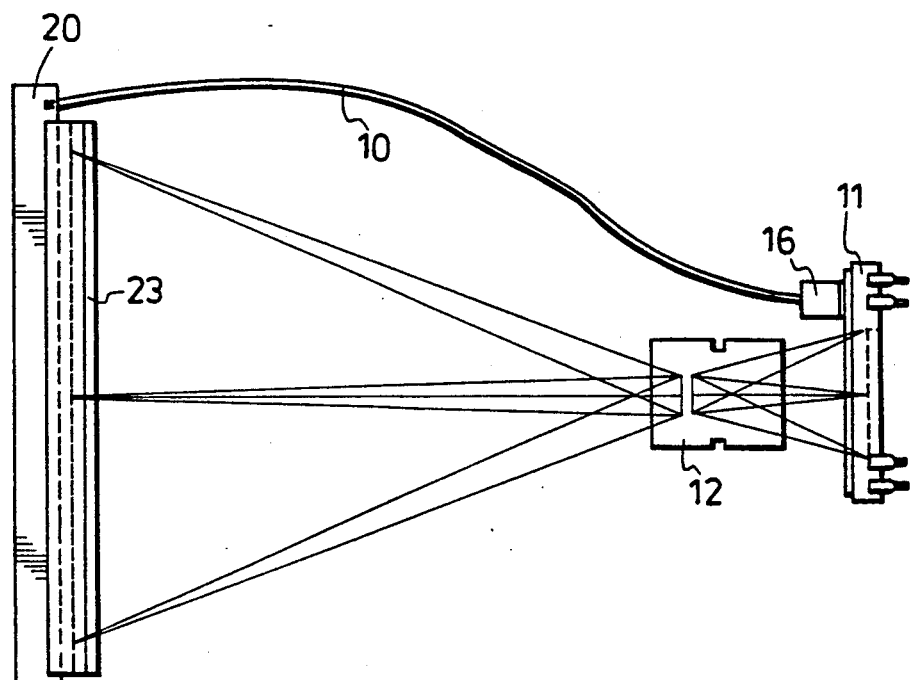
FIGS. 4A and 4B illustrate how light transmission between the light source and a line image sensor of the image scanner of the present invention is achieved.
Figure 4B:
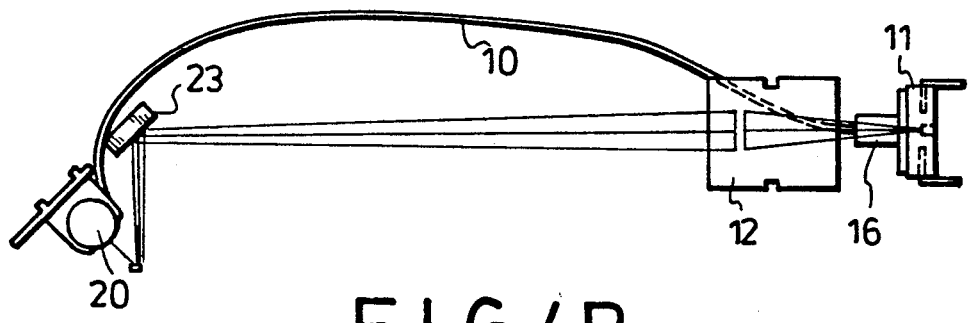

FIGS. 4A and 4B illustrate how light transmission is achieved between the light source and the line image sensor (11). The input end of the optical fiber (10) is in close proximity with a cold cathode fluorescent tube (20) of the image scanner and receives light rays therefrom for reception by the line image sensor (11). The optical fiber (10) is properly mounted on the lens barrel (15) so as to prevent light rays passing therethrough from interfering with image scan signals. The fluorescent tube (20) is arranged so as to illuminate a reading point on the document being scanned. The light rays reflected from the document are further reflected by a reflex mirror set (23) and pas through the imaging lens (12) for reception by the line image sensor (11). The light rays from the optical fiber (10) are therefore independent from and do not affect the light rays reflected from the document.

Figure 5A:
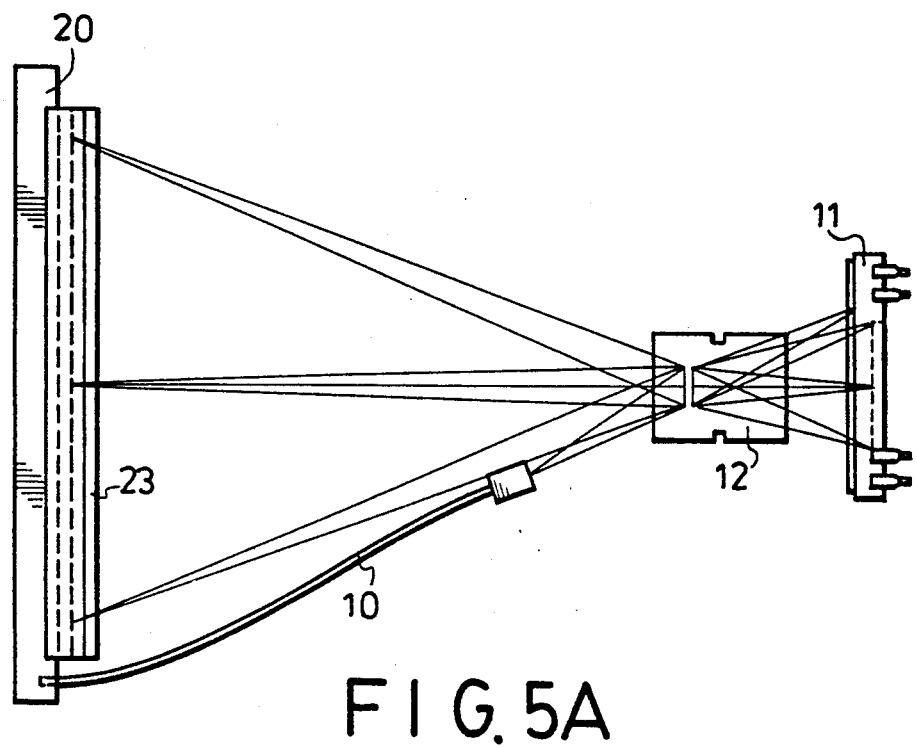
FIGS. 5A and 5B illustrate an alternative arrangement for light transmission between the light sensor and the line image sensor.
Figure 5B:
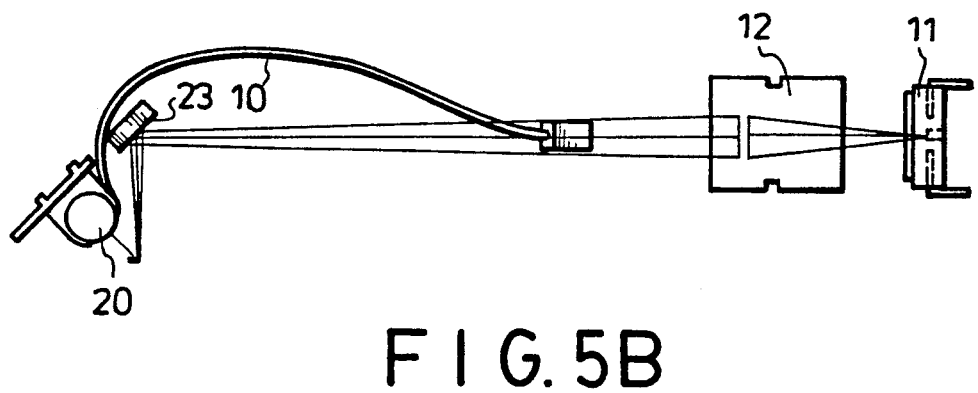

FIGS. 5A and 5B illustrate an alternative arrangement for light transmission between the optical fiber (10) and the line image sensor (11). The input end of the optical fiber (10) is similarly in close proximity with the cold cathode fluorescent tube (20). However, the output end of the optical fiber (10) is not directly connected to the line image sensor (11) but is instead disposed at a point before the imaging lens (12). The light rays from the optical fiber (10) are directed to the imaging lens (12) so as to be received in a proper detecting region of the line image sensor (11).

The line image sensor (11) has an array of light receiving elements (not shown) which respectively represent one picture element (or pixel). The light receiving elements are spaced by a distance of approximately 10 micrometers. An electric shutter is provided so as to control the exposure of the light receiving elements to the image scan signals to within a few milliseconds. Each of the light receiving elements generates a charge which corresponds to the intensity of the received signal. The charges from the light receiving elements are used to amplitude modulate the pulse train output of a control circuit (not shown). This illustrates how the line image sensor (1)) generates voltage signals that correspond to the document which is being scanned.

Note that when choosing an image scanner, the number of pixels per scan line which is offered thereby usually exceeds that which is required to scan a document. For example, an A6 sized document which has a width of approximately 4.13 inches and which is scanned at a resolution of 400 DPI (dots per inch) requires 1653 pixels per scan line. An image scanner which can provide 2048 pixels per scan line is usually used to scan such a document size. The imaging lens (12) reduces the size of the document so that only 1653 pixels out of the 2048 pixels which are provided by the image scanner are used. The remaining 395 pixels provided by the image scanner can be used to transmit the brightness reference signal. The line image sensor (11) can therefore provide two types of information per scan line: the first type of information has a longer period and corresponds to the reflected light from the document being scanned, while the second type of information has a shorter period and serves as the brightness reference signal.

Figure 6:
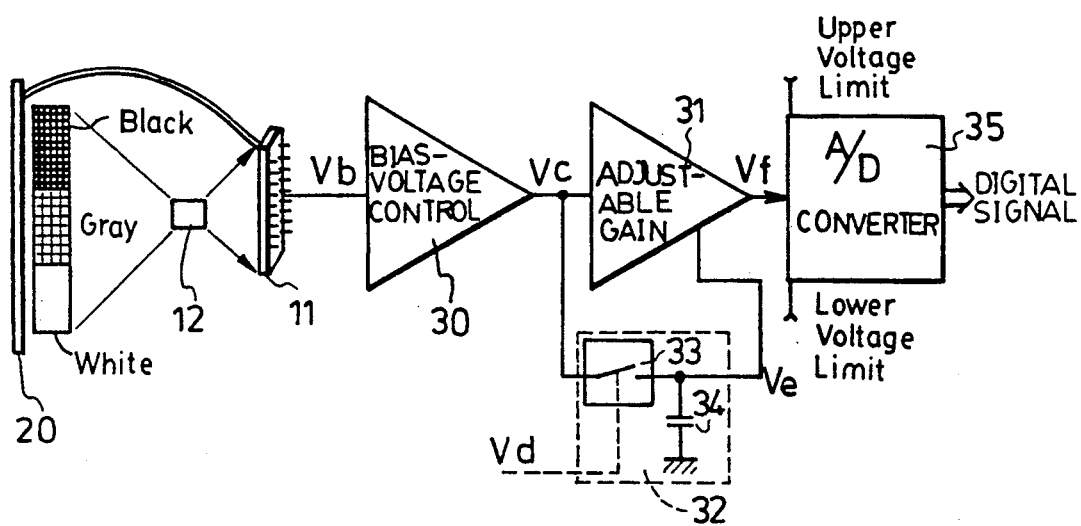
FIG. 6 is a circuit block diagram of the image scanner of the present invention.

Referring to FIG. 6, the voltage output from the line image sensor (11) is received by an amplifier and bias-voltage control circuit (30). The voltage output of the line image sensor (11) has a maximum value which is approximately 10 millivolts and a direct current (dc) component. The control circuit (30) amplifies the voltage output of the line image sensor (11) and adjusts the minimum value (or the dc component) of the latter to a more appropriate one (such as 0 volts). A sample and hold circuit (32) is used to sample the brightness reference signal and provides a negative feedback to an adjustable gain circuit (31). If the brightness reference signal is relatively large, indicating that the brightness of the light output is very strong, the amplification of the gain circuit (31) is reduced. If the brightness reference signal is relatively small, indicating that the brightness of the light output is very weak, the amplification of the gain circuit (31) is increased. Therefore, regardless of whether the brightness of the light output is very strong or very weak, the input voltage to an analog-to-digital (A/D) converter (35) that is connected to the gain circuit (31) is compensated to a standard value.

The following example facilitates the understanding of the operation of the circuit shown in FIG. 6. Referring to FIG. 6, the image scanner of the present invention is used to scan a line which has a black portion, a gray portion and a white portion. The reflected light from the white portion is the strongest, and thus, the voltage signal corresponding thereto is also the strongest. The reflected light from the black portion is the weakest, and thus, the voltage signal corresponding thereto is the weakest.

When the image scanner is activated, the brightness of the light output of the fluorescent tube (20) gradually intensifies during a brief transition period. Therefore, the amplitude of the voltage signals corresponding to the brightness reference signal and the image scan signals similarly increase during the same period. This is best illustrated by a plot of the voltage output (Vb) of the line image sensor (11), as shown in FIG. 7A.

The voltage output (Vb) is fed to the amplifier and bias-voltage control circuit (30). The control circuit (30) initially adjusts the level of the voltage output (Vb) so that the voltage signal corresponding to the black portion is equal to 0 volts and then amplifies the voltage output (Vb) by a predetermined amplification factor. The voltage output (Vc) of the control circuit (30) is shown in FIG. 7B.

The voltage output (Vc) of the control circuit (30) is received by the adjustable gain circuit (31) and by the sample and hold circuit (32). The sample and hold circuit (32) has a switch unit (33) which is controlled by a pulsating sampling signal (Vd), as shown in FIG. 7C. When the sampling signal (Vd) is in a high logic state, the switch unit (33) closes, thereby permitting the voltage output (Vc) to charge a capacitor (34). When the sampling signal (Vd) is in a low logic state, the switch unit (33) is opened, thereby maintaining the voltage across the capacitor (34) in the previously charged state.

It can be shown by comparing FIGS. 7B and 7C that the capacitor (34) charges to the brightness reference signal from the control circuit (30). FIG. 7D illustrates a plot of the voltage (Ve) across the capacitor (34) vs. time Note that the voltage (Ve) depends upon the brightness reference signal from the control circuit (30) and serves as a control input to the adjustable gain circuit (31). If the voltage (Ve) is relatively low, the amplification factor of the gain circuit (31) is increased. If the voltage (Ve) is relatively high, the amplification factor of the gain circuit (31) is reduced. A plot of the voltage output (Vf) of the gain circuit (31) as a function of time is shown in FIG. 7E. The levels of the voltage signals corresponding to the brightness reference signal, the white portion and the gray portion have been compensated to the respective standard values.

The voltage output (Vf) is received by the analog-to-digital (A/D) converter (35). If the converter (35) is an 8-bit A/D converter, the different colors on the document being scanned by the image scanner of the present invention can be represented by a corresponding one of the 256 possible digital signal outputs of the converter (35).

A conventional A/D converter is usually provided with a pair of dynamic control pins. One of the control pins receives an upper limit voltage input, while the other one of the control pins receives a lower limit voltage input. In the preferred embodiment, the lower limit voltage corresponds with the voltage signal (0 volts) that represents the color black, while the upper limit voltage corresponds with the voltage signal that represents the color white. This minimizes the occurrence of a too dark or too pale reproduction of the scanned document.

In a conventional image scanner, the actual voltage signal representative of the color white does not match the upper limit voltage when the image scanner is in the transition period or after prolonged use of the light source. During the transition period, the light output of the light source is relatively weak, and the voltage signal which represents the color white is lower than the upper limit voltage. When the voltage signal is processed by the A/D converter, the scanned color is erroneously decoded as gray, instead of white. This results in a dark reproduction of the scanned document. When the voltage signal which represents the color white is greater than the upper limit voltage, the voltage signal which represents the color gray is erroneously decoded by the A/D converter as white. This results in a pale reproduction of the scanned document. In the image scanner of the present invention, the brightness of the light output of the light source is detected and is used to control the amplification of a gain circuit, thereby permitting the voltage signal which represents the color white to correspond with the upper limit voltage.

Figure 8A:
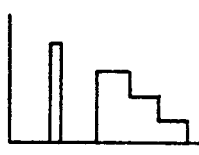
FIGS. 8A to 8C illustrate the different signals obtained when the distance between the light source and an optical transmission element of the image scanner is varied.
Figure 8B:
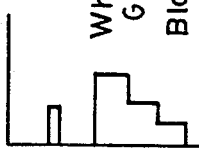
Figure 8C:
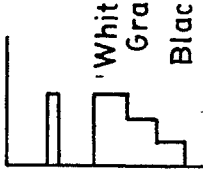

Note that the intensity of the light rays which propagate through the optical fiber is affected by the proximity of the input end thereof from the light source. Referring to FIG. 8A, if the input end of the optical fiber is too close to the light source, the brightness reference signal is excessively large. The color white is erroneously decoded as gray, thereby resulting in a dark reproduction of the scanned document. Referring to FIG. 8B, if the input end of the optical fiber is too far from the light source, the brightness reference signal is very small. The color gray is erroneously decoded as white, thereby resulting in a pale reproduction of the scanned document. Referring to FIG. 8C, the brightness reference signal should be equal in magnitude to the voltage signal which corresponds to the color white when the input end of the optical fiber is appropriately spaced from the light source.

Figure 9:
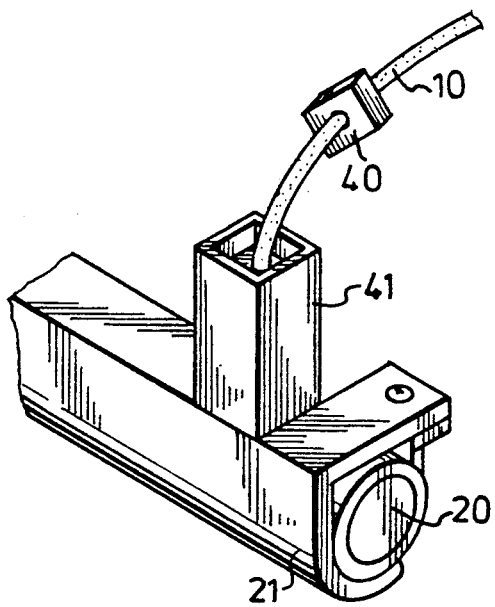
FIGS. 9 and 10 illustrate how the optical transmission element is mounted on the light source.
Figure 10:
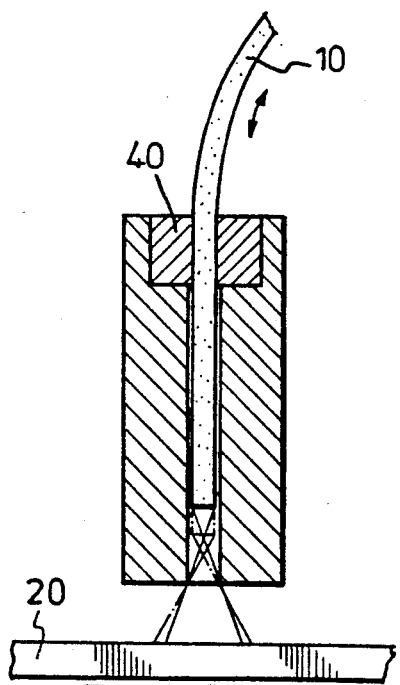

Therefore, adjustments in the position of the input end of the optical fiber relative to the light source should be conducted before using the image scanner of the present invention. Referring to FIGS. 9 and 10, the light source (20) includes a lamp holder (21) which is provided with a tubular guide (41). The optical fiber (10) extends into the tubular guide (41). Light rays from the light source (20) enter the tubular guide (41) so as to propagate in the optical fiber (10). The optical fiber (10) is extended into or retracted from the tubular guide (41) so as to vary the distance of its input end from the light source (20). The tubular guide (41) is provided with a plug (40) for holding the optical fiber (10) in place. The optical fiber (10) extends through and is frictionally held by the plug (40).

In order to determine if the input end of the optical fiber (10) is in a proper position relative to the light source (20), the preferred embodiment is used to scan a white document, and the position of the optical fiber (10) is then adjusted relative to the light source (20) until the brightness reference signal, as detected at the input to the A/D converter, becomes equal in magnitude with the upper limit voltage or with the voltage signal that represents the color white.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. An image scanner, comprising:
    a light source for illuminating a document being scanned;
    a reflex mirror set receiving a first light signal which results from light rays that are reflected by the document;
    a lens barrel having an imaging lens arranged therein and receiving said first light signal from said reflex mirror set;
    a flexible optical transmission element having an input end provided in close proximity with said light souce so as to receive a second light signal therefrom;
    a line image sensor disposed adjacent to said lens barrel and receiving said first light signal from said reflex mirror set and said second light signal from said optical transmission element, said line image sensor generating an image scan signal corresponding to said first light signal and a brightness reference signal corresponding to said second light signal; and
    a signal compensation circuit receiving said image scan signal and said brightness reference signal from said line image sensor, said signal compensation circuit processing and amplifying said image scan signal in accordance with the magnitude of said brightness reference signal, thereby compensating said image scan signal for instability in the brightness of light from said light source.

2. The image scanner as claimed in claim 1, wherein said signal compensation circuit comprises:
    an amplifier and bias-voltage control circuit receiving said image scan signal and said brightness reference signal from said line image sensor, said control circuit amplifying said image scan signal and said brightness reference signal and adjusting the minimum voltage of said image scan signal and said brightness reference signal to an appropriate voltage level;
    a sample and hold circuit operable so as to sample said brightness reference signal from said control circuit; and
    an adjustable gain circuit receiving said brightness reference signal sampled by said sample and hold circuit and said image scan signal from said control circuit, said adjustable gain circuit amplifying said image scan signal with an amplification factor which corresponds to said brightness reference signal from said sample and hold circuit.

3. The image scanner as claimed in claim 2, wherein said signal compensation circuit further comprises an analog-to-digital converter receiving said image scan signal from said adjustable gain circuit and generating a digital signal corresponding to the received said image scan signal.

4. The image scanner as claimed in claim 3, wherein said image scanner further comprises means for permitting adjustments in the distance between said input end of said optical transmission element and said light source.

5. The image scanner as claimed in claim 1, wherein said optical transmission element has an output end which extends into said lens barrel so as to connect directly with said line image sensor.

6. The image scanner as claimed in claim 1, wherein said optical transmission element has an output end which is disposed at a point before said imaging lens, said second light signal from said optical transmission element passing through said imaging lens for reception by said line image sensor.

7. The image scanner as claimed in claim 1, wherein said optical transmission element is an optical fiber.

* * * * *